April 29, 1924.
W. W. MILLER
1,491,812
OIL WELL SWAB
Filed Oct. 3, 1922
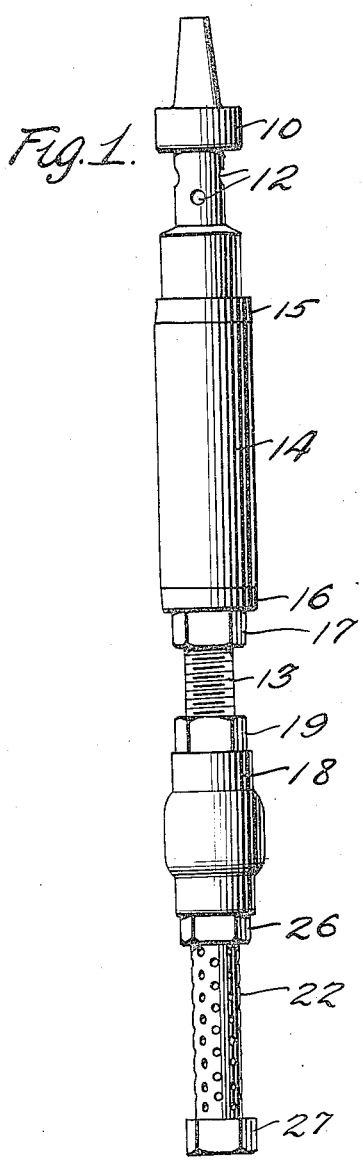
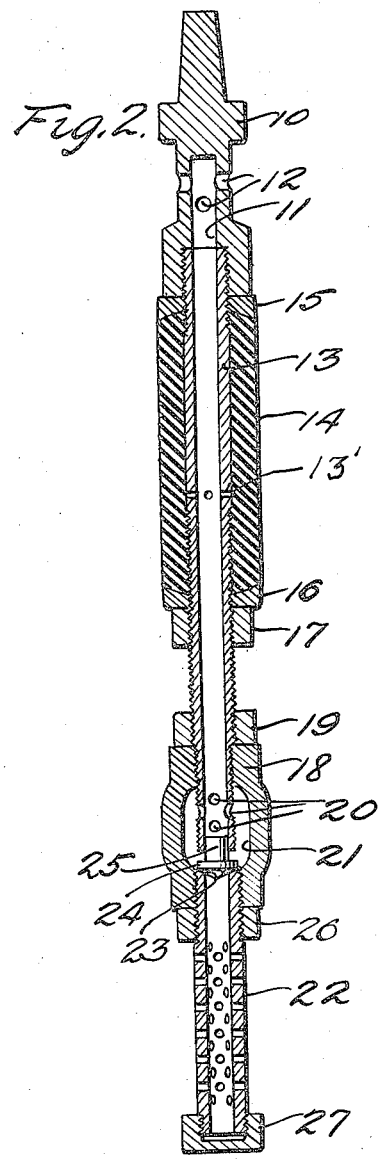
Inventor
William W. Miller
By Horace Chandler
Attorney Patented Apr. 29, 1924.

1,491,812

UNITED STATES PATENT OFFICE.

WILLIAM W. MILLER, OF BUNGER, TEXAS.

OIL-WELL SWAB.

Application filed October 3, 1922. Serial No. 592,063.

*To all whom it may concern:*

Be it known that I, WILLIAM W. MILLER, a citizen of the United States, residing at Bunger, in the county of Young, State of Texas, have invented certain new and useful Improvements in Oil-Well Swabs; and I do hereby declare the following to be a full, clear, and exact description of the invention, such as will enable others skilled in the art to which it appertains to make and use the same.

This invention relates to new and useful improvements in oil well devices and particularly to oil well swabs.

One object of the invention is to provide a swab of such construction that greater efficiency is produced, which reults in the extraction of a larger amount of liquid from the well than with similar devices heretofore.

Another object is to provide a device of this character wherein the ends of the rubber are protected against spreading action.

A further object is to provide a device of this character wherein the liquid and sediment may be more easily and quickly permitted to enter the lower end of the device, and be retained above the rubber.

Other objects and advantages will be apparent from the following description when taken in connection with the accompanying drawing.

In the drawing:

Figure 1 is an elevation of the swab made in accordance with the present invention.

Figure 2 is a longitudinal central sectional view through the swab.

Referring particularly to the accompanying drawing, 10 represents the chuck receiving head of the tool which includes an elongated cylindrical body the intermediate portion of which is reduced and angular and has a cavity or chamber 11 therein which extends through the lower end thereof, and in the walls of which are formed the outlet openings 12. Screwed into the lower end of the head 10 is the upper end of a pipe 13, and disposed on this pipe, below the head is a rubber sleeve 14, of a diameter sufficient to fit within the well casing or tube, not shown. On the pipe 13, between the lower end of the head 10 and the upper end of the sleeve 14, and below the lower end of the sleeve, are the packing rings 15 and 16, respectively, the faces of said rings abutting the ends of the sleeve being concave to fit the convex end faces of the sleeve. This construction serves to retain the ends of the sleeve against spreading action, as will be readily understood. A nut 17 is threadedly engaged on the pipe 13, below the ring 16, and is turned upwardly against the lower end of the sleeve.

Screwed onto the lower end of the pipe 13 is a sleeve 18, a lock nut 19 being engaged on the pipe and driven down against the sleeve. The pipe 13 extends to a distance into the sleeve, and is formed with a series of perforations 20. The intermediate portion of the sleeve 18 is enlarged in diameter, both internally and externally, to form the chamber 21, which surrounds the pipe 13, and thus forms a passage for the liquid to pass into the pipe and upwardly to exhaust through the openings 12. Screwed into the lower end of the sleeve 18 is a pipe 22, the upper end of which is formed with a valve seat 23, in which is seated the valve 24, said valve having guides 25 which fit within the lower end of the pipe 13, for vertical slidable movement. A jam nut 26 is engaged on the pipe 22 and is turned upwardly against the lower end of the sleeve 18, as clearly seen in Figure 2, of the drawing. The portion of the pipe 22, below the sleeve 18, is perforated for the entrance of the liquid from the bottom of the well. A closure cap 27 is screwed onto the lower end of the pipe 22, to exclude large particles from the pipe.

Attention is directed to the fact that the pipe 13 extends into the head 10 and into the sleeve 18, to such a distance that danger of the threads of the pipe being stripped is reduced to a minimum. In devices of this character heretofore the pipe has been merely screwed into the ends of the upper and lower connections, with the result that the strain, both vertically and sidewise, often caused the stripping of the threads of the pipe, and the loss of the swab in the well casing, and the expenditure of time and labor in fishing out the swab. With the present device the parts are so formed and connected that great strength is produced, and danger of breakage reduced to a minimum.

Another feature which might be again accented is the particular formation of the packing rings at the upper and lower ends of the rubber sleeve, which serve to confine the ends of the sleeve and thus prevent spreading thereof.

Formed in the intermediate portion of the pipe 13, midway of the length of the sleeve 14, are the perforations 13', which permit the pressure of the fluid from within the pipe to press against the rubber sleeve.

What is claimed is:—

1. A well swab including a central conduit, a sleeve on the conduit and receiving the conduit therein, the sleeve being enlarged to form a chamber surrounding the internally disposed portion of the conduit, the said portion of the conduit being perforated, a valve seat in the lower end of the sleeve, and a valve on the seat and having a stem slidably guided in the lower end of the conduit.

2. A well swab including a piston having a central conduit extending beyond one end of the body of the piston and being perforated and externally threaded, a sleeve threaded through each end portion and being formed centrally with a chamber, the perforated end of said conduit being engaged through one of said threaded ends of the sleeve and lying within said chamber, a perforated tube engaged in the other threaded end of the sleeve and having its engaged end lying in the bottom of said chamber and forming a valve seat, and a valve on the seat and having a stem slidable in the adjacent end of the conduit.

In testimony whereof, I affix my signature, in the presence of two witnesses:

WILLIAM W. MILLER.

Witnesses:
WALTER DAVID,
R. G. CLOY.